United States Patent Office 2,903,392
Patented Sept. 8, 1959

2,903,392

β-THIOSUBSTITUTED ACYLAMINO-NITRO PROPIOPHENONES

Carlo Giuseppe Alberti and Alberto Vercellone, Milan, Italy, assignors to Società Farmaceutici Italia, a corporation of Italy No Drawing. Application March 1, 1956
Serial No. 568,709

Claims priority, application Italy March 12, 1955

9 Claims. (Cl. 167—30)

This invention relates to new synthetic products and to the method of making the same. More specifically, the invention relates to nitro-α-acylamino-β-thio-propiophenones having the general formula (I)

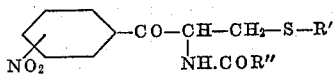

wherein R′ represents alkyl, aminoalkyl, substituted aralkyl, substituted aryl, and

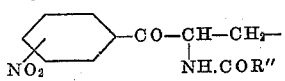

and R″ represents alkyl, aryl, and dihaloalkyl.

These compounds were found to not only exert strong physiological effects as such, but to represent valuable intermediates for other therapeutic products.

More specifically, these compounds were found to be powerful fungicides, for example against *Aspergillus niger*, *Candida albicans*, *Alternaria solani*, *Penicillium notatum*, *Fusarium dimerum*, *Helmintosporium oryzae*, etc.

According to the present invention, these compounds are synthesized by reacting a nitro-acylamino-acrylophenone of the general formula

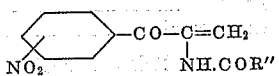

wherein R″ represents alkyl, aryl, and dihaloalkyl, with a sulfurated compound of the type

R.SH wherein R represents H, alkyl, aminoalkyl, substituted aralkyl, and substituted aryl. The two reactants are dissolved in an inert solvent, such as aliphatic and aromatic hydrocarbons, chlorinated hydrocarbons, esters, alcohols and ethers, and are treated at a temperature from 0° to 100° C., with or without an alkaline catalyst such as tertiary amines, alkaline alcoholates or alkaline carbonates.

After filtering the reaction mixture, the compounds of formula I are obtained by evaporating the solvent.

The α-acylamino-nitro-acrylophenones used as starting materials in this synthesis are produced according to U.S. patent application Serial No. 432,034 of May 24, 1954, now abandoned.

The following examples are presented to illustrate the present invention, without intending to thereby limit the scope of the appended claims.

Example 1

2.34 gr. of p-nitro-α-acetamino-acrylophenone are heated to boiling with 1.46 gr. of mono-thiohydroquinone in 50 cc. of benzene. After boiling for 10 minutes, dissolution occurs and after 30 minutes precipitation of a crystalline, lightly yellow-colored compound commences. Having boiled the reaction mixture for 4 hours, the precipitate is filtered off and washed with benzene; pure p-nitro-α-acetamine-β-(p - hydroxyphenyl - thio)propiophenone is obtained, having a M.P. of 168° C. and the formula

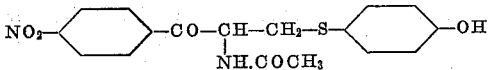

Example 2

2.34 gr. of p-nitro-α-acetamino-acrylophenone are mixed with 1.34 gr. of diethylamino-thioethanol in 50 cc. of benzene and heated to 40° C. while stirring, in the presence of 0.1 gr. of anhydrous potassium carbonate. After 5 hours, the mixture is filtered and is left standing overnight. Upon evaporating the benzene, an oleous residue is obtained, that is crystallized from an ethyl ether-petroleum ether mixture. The resulting p-nitro-α-acetamino-β-(2-diethylaminoethylthio)propiophenone appears in the form of little white crystals having a M.P. of 60–61° C. and the formula

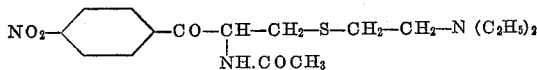

Example 3

3.03 gr. of p - nitro - α - dichloroacetamino - acrylophenone are heated to boiling with 1.54 gr. of thiosalicylic acid in 50 cc. of benzene. After boiling for one hour, the resulting precipitate is filtered off and recrystallized from ethanol to give pure p-nitro-α-dichloroacetamino-β-(2-carboxylphenylthio)propiophenone which is obtained in form of small, lightly yellow-colored needles, having a M.P. of 190–191° C. and the formula

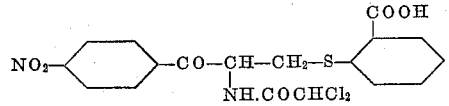

Example 4

2.34 gr. of p-nitro-α-acetamino-acrylophenone are heated to boiling with 1.54 gr. of thiosalicylic acid in 50 cc. of benzene. After 4 hours, the resulting precipitate is filtered off and is recrystallized from ethanol to furnish pure p - nitro - α - acetamino - β - (2 - carboxylphenylthio)propiophenone which occurs in form of lightly yellow needles, having a M.P. of 187° C. and the formula

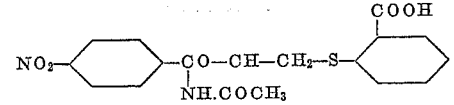

Example 5

2.34 gr. of p-nitro-α-acetamino-acrylophenone are mixed with 0.62 cc. of n-butylmercaptan in 10 cc. of benzene and stirred at 40° C. for 5 hours in the presence of 0.1 anhydrous potassium carbonate. The mixture is then filtered, and after standing over night, the filtrate is evaporated to dryness. The residue, crystallized from methanol, represents pure p-nitro-α-acetamino-β-n-butyl-thio-propiophenone appearing in form of small white scales having a M.P. of 106°–108° C. and the formula

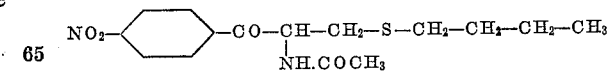

Example 6

The foregoing example is repeated, except that, by using p - nitro - α - dichloro - acetoamino - acrylophenone, p - nitro - α - dichloroacetoamino - β - n - butyl-thio-propiophenone is obtained in form of white needles, having a M.P. of 87–88° C. (from methanol), and the formula

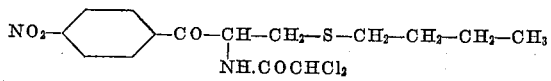

Example 7

2.34 gr. of p-nitro-α-acetoamino-acrylophenone are dissolved in 10 cc. of dioxane and the solution is saturated with H₂S. After standing for 48 hours at room temperature, the yellow solution is diluted with water and extracted with ethyl acetate. After evaporation of the solvent, a residue is obtained that, upon dissolution in ethanol, crystallizes into bis(2-p-nitrobenzoyl-2-acetoaminoethyl)sulphide which, after recrystallization from methyl-Cellosolve (glycol monomethyl ether), has a M.P. of 202–203° C. and the formula

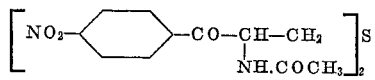

We claim:

1. The fungicidal compounds, para-nitro-alpha-acylamino-beta-thio-propiophenones of the formula:

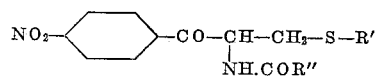

wherein R' represents a member of the group consisting of n-butyl, 2-diethylaminoethyl, p-hydroxyphenyl, 2-carboxylphenyl and

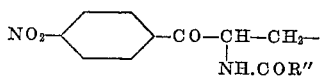

and R" represents a member of the group consisting of methyl and dichloro-methyl.

2. The fungicide, 2-p-nitrobenzoyl-2-acetamino-ethylsulfide, having the formula

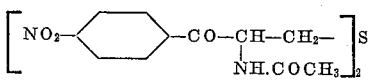

3. The fungicide, p-nitro-α-acetamino-β-(p-oxyphenyl-thio)propiophenone, having the formula

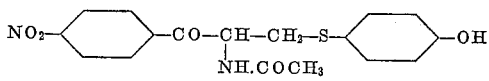

4. The fungicide, p - nitro - α - acetamino - β - (2-diethylamino ethylthio)propiophenone

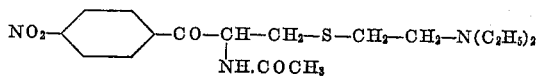

5. The fungicide, p - nitro - α - acetamino - β -n-butyl-thio-propiophenone, having the formula

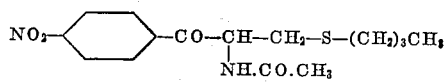

6. The fungicide, p - nitro - α - dichloroacetamino-β-n-butyl-thio-propiophenone, having the formula

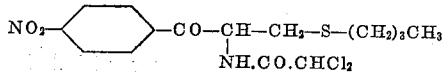

7. The fungicide, p - nitro - α - acetamino - β - (2-carboxy-phenyl-thio)propiophenone, having the formula

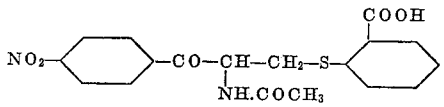

8. The fungicide, p - nitro - α - dichloro - acetamino-β - (2 - carboxyl - phenyl - thio)propiophenone, having the formula

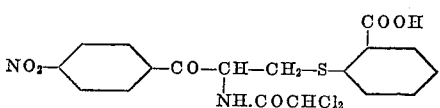

9. In the art of combatting fungi, the improvement comprising applying to the locale of the fungi a fungicidal compound of the formula

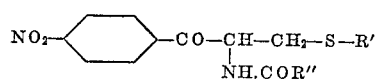

wherein R' represents a member of the group consisting of n-butyl, 2-diethylaminoethyl, p-hydroxyphenyl, 2-carboxyphenyl and

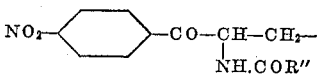

and R" represents a member of the group consisting of methyl and dichloro-methyl.

References Cited in the file of this patent

UNITED STATES PATENTS

| | | |
|---|---|---|
| 2,406,362 | Farlow | Aug. 27, 1946 |
| 2,681,364 | Long et al. | June 15, 1954 |

OTHER REFERENCES

Farkas et al.: Chemické Listy 48, No. 1–6, pp. 695–705 (1954).

Farkas et al.: Coll. Czech. Chem. Commun., vol. 19, pp. 754–765 (1954).

Farkas et al.: Chem. Absts. 49, col. 9551 (1955).